United States Patent [19]
Hegner et al.

[11] Patent Number: 5,334,344
[45] Date of Patent: Aug. 2, 1994

[54] TERNARY ACTIVE BRAZING BASED ON A ZIRCONIUM-NICKEL ALLOY

[75] Inventors: Frank Hegner, Lörrach; Elke Schmidt, Schopfheim; Thomas Klähn, Freiburg-Opfingen, all of Fed. Rep. of Germany; Peter Reimann, Buckten, Switzerland; Heinz Breitenstein, Bättwil, Switzerland; Stephan Messmer, Allschwil, Switzerland

[73] Assignee: Endress u. Hauser GmbH u. Co., Fed. Rep. of Germany

[21] Appl. No.: 791,092

[22] Filed: Nov. 12, 1991

[30] Foreign Application Priority Data

Nov. 13, 1990 [EP] European Pat. Off. ........ 90710031.7
Sep. 4, 1991 [DE] Fed. Rep. of Germany ....... 4129414

[51] Int. Cl.$^5$ .............................................. C22C 16/00
[52] U.S. Cl. ............................. 420/422; 228/262.21; 228/121; 228/122.1
[58] Field of Search .................... 420/422; 228/263.21

[56] References Cited

U.S. PATENT DOCUMENTS

| | | | |
|---|---|---|---|
| 3,740,830 | 6/1973 | Campbell, Jr. et al. | 29/501 |
| 4,026,677 | 5/1977 | Galasso et al. | 428/649 |
| 4,034,454 | 7/1977 | Galasso et al. | 428/660 |
| 4,082,834 | 4/1978 | Grossman | 420/422 |
| 4,126,449 | 11/1978 | Tanner et al. | 420/422 |
| 4,448,853 | 5/1984 | Fischer et al. | 428/607 |
| 4,859,415 | 8/1989 | Shida et al. | 420/418 |

FOREIGN PATENT DOCUMENTS

| | | |
|---|---|---|
| 0038584 | 10/1981 | European Pat. Off. |
| 0055827 | 7/1982 | European Pat. Off. |
| 0332978 | 9/1989 | European Pat. Off. |
| 0342506 | 11/1989 | European Pat. Off. |
| 1150818 | 6/1963 | Fed. Rep. of Germany |
| 59-116350 | 7/1984 | Japan .............. C22C 14/00 |
| 59-212189 | 12/1984 | Japan .............. B23K 35/32 |
| 61-126992 | 6/1986 | Japan .............. C22C 16/00 |
| 63-273592 | 11/1988 | Japan .............. C22C 14/00 |

OTHER PUBLICATIONS

Massalski, T. B. (ed.) Binary Alloy Phase Diagrams, vol. 2, ASM, 1986, p. 1779.

Primary Examiner—Upendra Roy
Attorney, Agent, or Firm—Barnes & Thornburg

[57] ABSTRACT

This active brazing preferably serves to braze (join) ((aluminum-)oxide-)ceramic parts or single crystals or metal parts or to braze (join) ((aluminum-)oxide-)ceramic parts to single crystals or ((aluminum-)oxide-)ceramic parts or single crystals to metal parts. In addition to the zirconium-nickel alloy, which is composed of 70 atom % to 85 atom % zirconium and 15 atom % to 30 atom % nickel, it contains titanium. In an apparatus for fabricating a foil (6) from this ternary active-brazing alloy by melt spinning which has a uniform thickness and two surfaces that are as smooth as possible, the alloy, after being melted by high-frequency heating in a cylindrical crucible (1) made completely of a high-temperature-resistant and highly thermally conductive nonmetallic material, particularly of high-density graphite or of boron nitride, is forced through an opening (3) in the bottom of the crucible onto a metal drum (5) of high thermal conductivity rotating at a high circumferential speed, on which the liquid alloy solidifies at a cooling rate on the order of $10^3°$ to $10^6°$ C./s. A product made using this ternary active brazing is a pressure sensor (10) having a substrate (12) and a diaphragm (11) of ceramic, particularly alumina ceramic, preferably with a purity of 96 wt. %, which are thermally joined around the periphery in a defined spaced relationship (d) and parallel to each other by means of the active brazing, e.g., by means of a preform (20) made therefrom, thus forming a chamber (13).

3 Claims, 2 Drawing Sheets

TERNARY ACTIVE BRAZING BASED ON A ZIRCONIUM-NICKEL ALLOY

This application claims priority from European Application 90 71 0031.7, filed Nov. 13, 1990, and German Application P 41 29 414.9, filed Sep. 4, 1991.

BACKGROUND AND SUMMARY OF THE INVENTION

The subject matter of the present invention consists in a ternary active brazing based on a zirconium-nickel alloy composed of 70 atom % to 85 atom % zirconium and 15 atom % to 30 atom % nickel, preferably for brazing ((aluminum-)oxide-)ceramic parts or single crystals or metal parts or for soldering ((aluminum-)oxide-)ceramic parts to single crystals or ((aluminum-)oxide-)ceramic parts or single crystals to metal parts, which contains titanium in addition to the zirconium-nickel alloy.

Active solders are alloys containing at least one element having an affinity for oxygen, such as titanium, so that no fluxes are necessary during soldering.

EP-A-332 978 discloses a brazing foil for brazing ceramic to ceramic, ceramic to metal, and metal to metal which is made of a binary alloy composed of zirconium and nickel. The phase diagram of the zirconium-nickel alloy is described in a standard work by M. Hansen, "Constitution of Binary Alloys", 2nd Edition, New York, 1958, pages 1062/1063.

Experiments conducted by the inventors have shown, however, that the products made using the prior art brazzing foils do not have satisfactory properties, particularly if they are alumina (=aluminum-oxide)-ceramic parts.

When investigating the causes and looking for improvements, the inventors discovered to their surprise that zirconium-nickel alloys are especially suited for brazing or joining ((aluminum-)oxide-)ceramic parts or single crystals or metal parts or for soldering ((aluminum-)oxide-)ceramic parts to single crystals or ((aluminum-)oxide-)ceramic parts or single crystals to metal parts if titanium is added. In this manner, the coefficients of thermal expansion of these novel active solders can be very well adapted to those of the parts to be soldered, and an optimum can be achieved between wetting, mechanical strength, and thermal expansion in the area of the soldered joint, so that stresses between the active-solder layer and, e.g., the ceramic in sensitive components can be minimized or completely avoided.

As was found by the inventors, the brazed joint produced by means of such active brazings not only is high-vacuum-tight but also has a very high mechanical strength.

Especially suited is a ternary active brazing composed of 70 atom % to 85 atom % of the zirconium-nickel alloy and 15 atom % to 30 atom % titanium.

The zirconium-nickel alloy advantageously has a near-eutectic composition, whereby a range near to the eutectic composition (=24 atom % nickel, 76 atom % zirconium) of ±5 atom % is to be understood; the eutectic zirconium-nickel alloy is particularly suited, of course.

An apparatus for fabricating a foil from an active-brazing alloy, particularly from said ternary zirconium-nickel-titanium alloys, by melt spinning which has a uniform thickness and two surfaces that are as smooth as possible comprises a cylindrical crucible made completely of a high-temperature-resistant and highly thermally conductive nonmetallic material, particularly of high-density graphite or of boron nitride, in which the alloy is melted, e.g., by high-frequency heating, and forced through an opening in the bottom of the crucible onto a metal drum of high thermal conductivity rotating at a high circumferential speed, on which the liquid alloy solidifies at a cooling rate on the order of $10^{3°}$ to $10^{6°}$ C./s.

The crucible preferably consists of two parts, an upper part and a lower part, which advantageously have a constant wall thickness and are screwed together.

The opening is preferably located at the center of the bottom of the crucible and projects from the bottom surface. Advantageously, the opening is located vertically above the metal drum in the prolongation of the diameter of the drum.

The melt-spinning process serves to fabricate metal ribbons or foils, mostly from alloys, which are brittle if fabricated by a process other than melt spinning. Melt spinning makes it possible to fabricate ductile and, hence, mechanically workable foils, since they are a solidified liquid like glass and, therefore, are also called "metallic glasses".

So far, crucibles of high-temperature-resistant, but poorly thermally conductive nonmetallic material, such as quartz, have generally been used in the melt-spinning process, since melting temperatures between 800° C. and 1500° C. are necessary, depending on the composition of the alloy.

As the inventors have found, such crucibles are not suitable for melt-spinning active-brazing alloys, because such alloys usually wet the crucible, so that, when the active-brazing alloy is pressed through the crucible opening, molten metal will not only solidify in foil form on the metal drum as desired but, because of its wetting ability, will also reach the other portions of the crucible opening and solidify there because of the poor thermal conductivity of the conventional crucibles. As a result, the active-brazing strip will fray or even break.

By the choice of highly thermally conductive nonmetallic material, particularly high-density graphite or boron nitride, as the material for the crucible, this difficulty, particularly in the production of thin, smooth zirconium-nickel-titanium foils, is overcome.

The above-mentioned excellent properties of the ternary active brazing are achieved by the reaction of the active brazing with the ceramic, and become particularly apparent in a pressure sensor comprising a substrate and a diaphragm of ceramic, particularly alumina ceramic, preferably with a purity of 96 wt. %, which are thermally joined around the periphery in a defined spaced relationship and parallel to each other by means of one of said active brazings e.g., by means of a preform made therefrom, thus forming a chamber.

Such pressure sensors, e.g., resistive or capacitive ones, are typical stress-sensitive components; they should exhibit no or only negligible temperature hysteresis of electrical characteristics in a temperature range of, e.g., −40° C. to +130° C. If the coefficients of thermal expansion of the ceramic and the active brazing are not sufficiently close together, the active brazing will be plastically and, thus, irreversibly deformed during operation in this temperature range, and the ceramic may even come off in one place and another. As a result, the spatial association of the sensor parts will change, even though only slightly. This new configuration, however, results in different electrical characteristics. Since the latter represent the measurand, e.g., a pressure, the sensor now has a (undesired) temperature hysteresis.

To avoid this temperature hysteresis, the active brazing must thus have a coefficient of thermal expansion which is ideally equal to that of the ceramic or the single crystal, i.e., which actually comes as close as possible to the latter coefficient.

In the above-mentioned pressure sensors, the high static strength and high fatigue strength under alternating stresses of the active brazings based on a zirconium-nickel-titanium alloy can be readily proved: In creep tests at elevated temperatures, e.g., 130° C., and under rated pressure and in overload impact tests, no changes in sensor data were observed over long test times.

The invention and its further features will now be explained in more detail with reference to the accompanying drawings, in which the construction of a capacitive pressure sensor and parts of a preferred embodiment of the apparatus for producing the active-brazing foil or ribbon are illustrated as preferred embodiments.

DETAILED DESCRIPTION OF THE DRAWINGS

Figure 1:
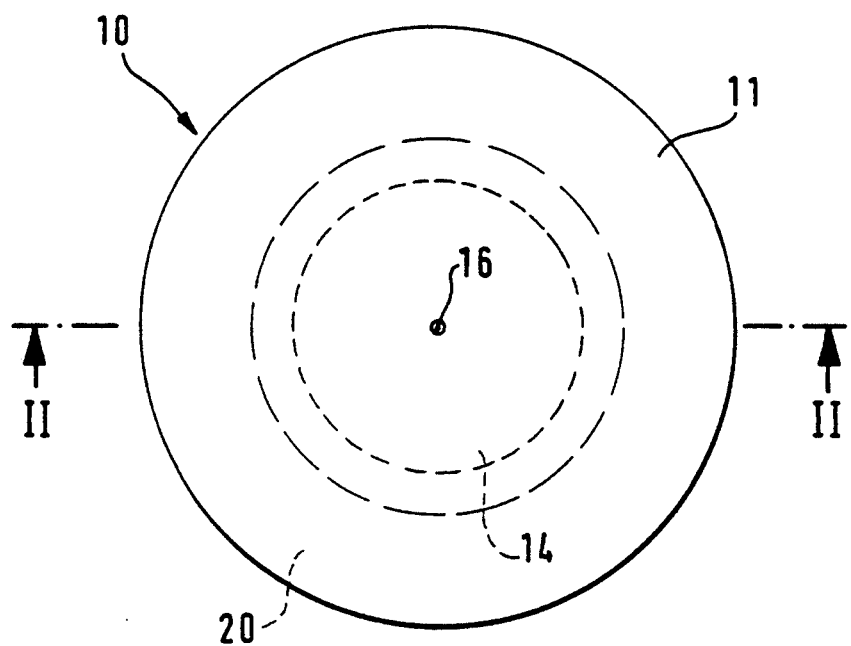
FIG. 1 is a top view of such a pressure sensor.
Figure 2:
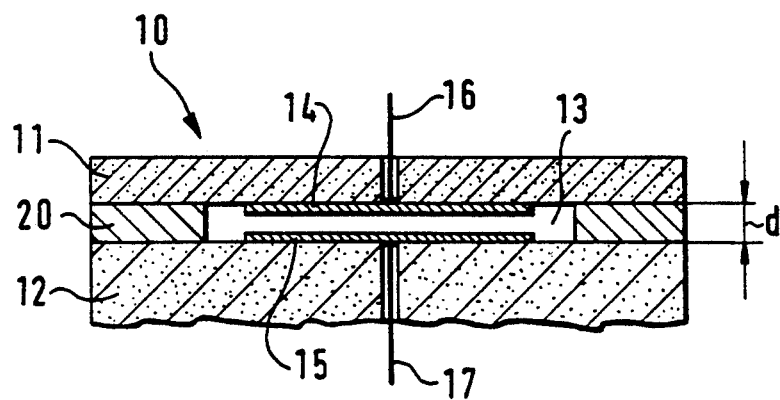
FIG. 2 is a section taken along Line II—II of FIG. 1.

The capacitive pressure sensor 10 shown in FIGS. 1 and 2 has a diaphragm 11 in the form of a circular disk with plane-parallel surfaces which is joined around the periphery to a circular substrate 12 in a defined spaced relationship d, so that a chamber 13 is formed between the flat top side of the substrate 12 and the opposite side of the diaphragm 11. The diaphragm 11 and the substrate 12 are made of ceramic, e.g., alumina ceramic, preferably with a purity of 96 wt. %. The diaphragm 11 is elastic, so that it can deform when pressure is applied to it, whereby it deflects toward one side or the other. The substrate 12 may be solid and rigid; if necessary, it may also be a flat elastic disk like the diaphragm 11.

Within the chamber 13, those surfaces of the diaphragm 11 and the substrate 12 which face each other are provided with circular conductive layers 14, 15 of a suitable metal, e.g., tantalum, which lie opposite each other. Connected to the conductive layer 14 is a lead 16 which is fed through the diaphragm 11 in a gas-tight manner, e.g., in the form of a brazed-in active-brazing-covered wire. Similarly, the conductive layer 15 has a lead 17 connected thereto which i s brought out in a gas-tight manner.

The conductive layers 14, 15 form the electrodes of a capacitor whose capacitance depends on the distance between the conductive layers. When the diaphragm 11 deforms under pressure, the distance between the conductive layers changes, thereby changing the capacitance of the sensor. This capacitance can be measured by means of an electronic circuit connected to the leads 16, 17 and is a measure of the pressure on the sensor.

For the sake of completeness it should be mentioned that there are also sensors with more than two electrodes. For example, one of the two surfaces may support two concentric electrodes which, together with the common opposite electrode, form two capacitors having a common electrode which may be used, for example, as a measuring capacitor and a reference capacitor, respectively.

The peculiarity of the pressure sensor shown consists in the way the diaphragm 11 and the substrate 12 are joined around the periphery. They are brazed there in a gas-tight manner by means of a suitable preform 20 made from one of the active brazings in accordance with the invention, e.g., from a near-eutectic or the eutectic zirconium-nickel alloy plus titanium, without the respective surfaces of the diaphragm 11 and the substrate 12 having to be metallized or without the need for a flux, The thickness of the preform 20 determines the distance between the diaphragm 11 and the substrate 12, The preform 20 is, for example, a ring which is formed, e.g., stamped, from an active-brazing foil strip produced by melt spinning or by spray deposition, if necessary in an inert gas, and having an amorphous or microcrystalline structure. In such foils, the individual elements of the active brazing are very homogenously and finely distributed, which is particularly important for reliable joining. On the other hand, such rings may also be produced directly from the melt by die casting or centrifugal casting.

Instead of the preform, an active-brazing paste consisting of an amorphous or microcrystalline active-powder and a suitable organic binder may be applied to the parts to be soldered.

Figure 3:
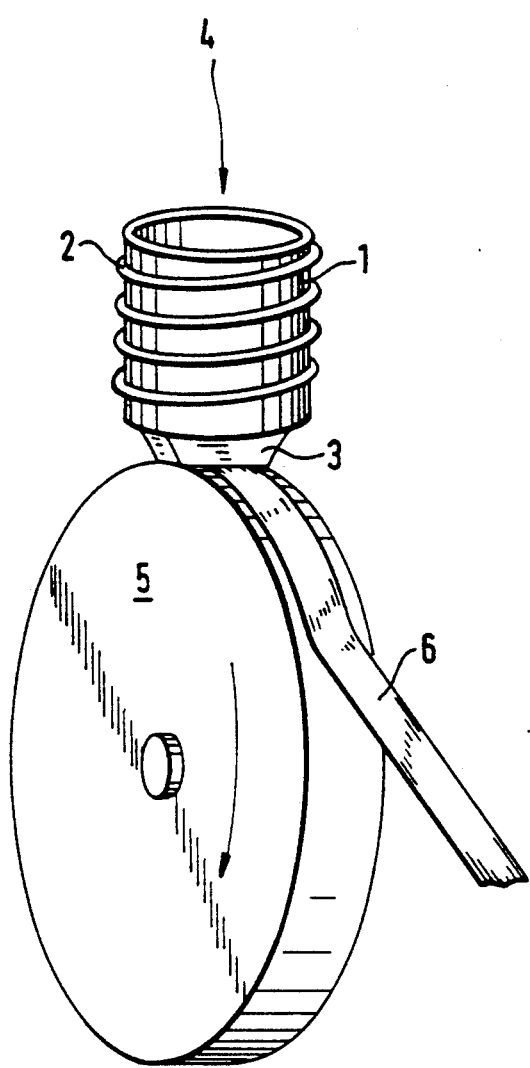
FIG. 3 shows schematically the principle of an apparatus for carrying out the melt-spinning process.

FIG. 3 is a schematic, perspective view of the parts necessary to understand the operation of an apparatus for carrying out the melt-spinning process. A preferably cylindrical crucible I formed completely from a high-temperature-resistant and highly thermally conductive non-metallic material and having a preferably constant wall thickness is heated, e.g., by means of high-frequency energy, which is done with a coil 2. The crucible 1 is provided with an opening 3 which projects from the bottom face of the crucible and is preferably located at the center of the bottom. This opening 3 is advantageously located vertically above a metal drum 5 in the prolongation of its diameter. The crucible 1 is advantageously made of high-density graphite or of boron nitride.

By intermittent application of a pressure 4 to the molten active-brazing alloy in the crucible 1, the alloy is forced through the opening 3 onto the circumference of the rotating metal drum 5, where it solidifies very quickly into the desired strip 6 of uniform thickness and with two smooth surfaces, since the high thermal conductivity of the crucible I prevents the molten metal from solidifying around the opening 3 of the crucible despite any wetting of this area.

The metal drum 5 rotates at a high circumferential speed and has a high thermal conductivity. This is achieved, for example, by forming the drum completely from copper or by coating its circumferential surface with copper. The drum may also be cooled from inside with a cooling liquid, such as water. By this design of the metal drum 5, cooling rates of the liquid alloy on the order of $10^{3°}$ to $10^{6°}$ C./s can be achieved.

Figure 4:
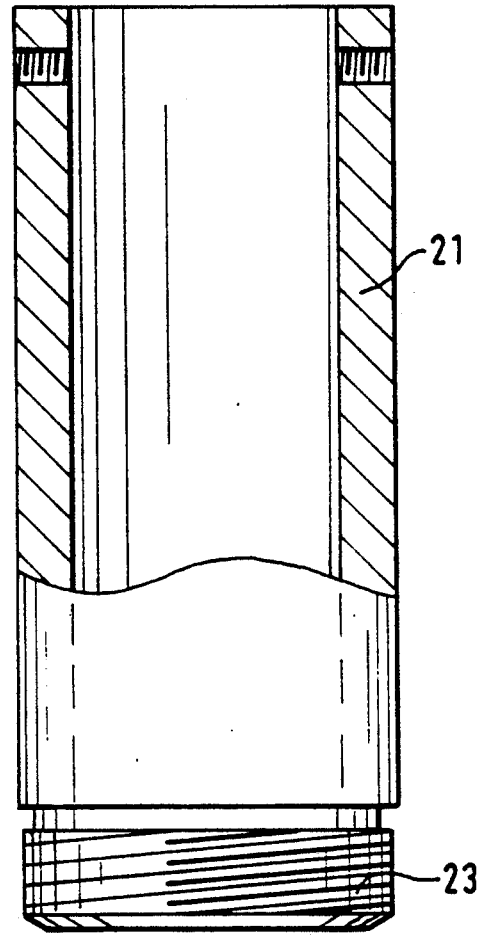
FIG. 4 shows schematically the construction of a two-part crucible.
Figure 4:
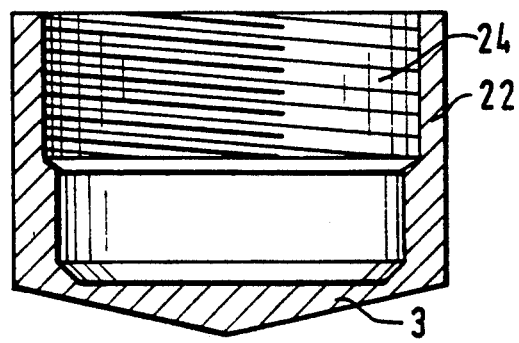

FIG. 4 shows schematically a variant of the crucible. It consists of two parts, namely an upper part 21 and a lower part 22. The upper part 21 can be screwed by means of a thread 23 into a corresponding thread 24 of the lower part 22. Thus, the lower part 2 can be destroyed when it has become useless, while use of the upper part 21 can continue. This variant of the apparatus thus saves manufacturing costs. The volume of the lower part 22 should be so dimensioned that there is so much space for the total quantity of molten metal that no molten metal can penetrate into the threads 23, 24.

We claim:

1. In a method for brazing ceramic parts, single crystals, metal parts, ceramic parts to single crystals, ceramic parts to metal parts, or single crystals to metal parts with a brazing alloy to form a brazed joint, the improvement comprising using a ternary active brazing alloy containing 15 atom % to 30 atom % titanium and 70 atom % to 85 atom % of a zirconium-nickel alloy comprising 70 atom % to 85 atom % zirconium and 15 atom % to 30 atom % nickel.

2. A ternary active brazing as claimed in claim 1 wherein the zirconium-nickel alloy has a near-eutectic composition.

3. A ternary active brazing as claimed in claim 2 wherein the zirconium-nickel alloy has its eutectic composition.

* * * * *